(12) United States Patent
Lefebvre et al.

(10) Patent No.: US 8,279,517 B2
(45) Date of Patent: Oct. 2, 2012

(54) OPTICAL PARAMETRIC OSCILLATOR WITH ACHROMATIC PHASE-MAINTAINING PUMP RETURN

(75) Inventors: Michel Lefebvre, Orsay (FR); Ajmal Mohamed, Palaiseau (FR); Antoine Godard, Paris (FR)

(73) Assignee: Office National d'etudes et de Recherches Aerospatiales (Onera), Chatillon (FR)

( * ) Notice: Subject to any disclaimer, the term of this patent is extended or adjusted under 35 U.S.C. 154(b) by 457 days.

(21) Appl. No.: 12/308,678

(22) PCT Filed: Jun. 27, 2007

(86) PCT No.: PCT/EP2007/056438
§ 371 (c)(1),
(2), (4) Date: May 3, 2010

(87) PCT Pub. No.: WO2008/000773
PCT Pub. Date: Jan. 3, 2008

(65) Prior Publication Data
US 2010/0226003 A1    Sep. 9, 2010

(30) Foreign Application Priority Data
Jun. 27, 2006  (FR) ...................................... 06 05782

(51) Int. Cl.
*G02F 1/35* (2006.01)
*H01S 3/10* (2006.01)

(52) U.S. Cl. .......................... 359/330; 359/326; 372/22

(58) Field of Classification Search ........................ None
See application file for complete search history.

(56) References Cited

U.S. PATENT DOCUMENTS

| 5,995,522 A * | 11/1999 | Scherrer et al. ................. 372/21 |
| 6,295,160 B1 | 9/2001 | Zhang et al. |
| 7,248,397 B1 * | 7/2007 | Armstrong et al. ........... 359/330 |
| 2007/0223083 A1 * | 9/2007 | Lefebvre et al. ............... 359/330 |

FOREIGN PATENT DOCUMENTS

| EP | 0 878 881 A1 | 11/1998 |
| FR | 2 093 928 A1 | 2/1972 |
| FR | 2 869 118 A1 | 10/2005 |

OTHER PUBLICATIONS

Bjorkholm, J., et al., "Improvement of Optical Parametric Oscillators by Nonresonant Pump Reflection," IEEE Journal of Quantum Electronics, vol. QE-6, No. 12 (Dec. 1970) pp. 797-799.

(Continued)

*Primary Examiner* — Hemang Sanghavi
(74) *Attorney, Agent, or Firm* — Blakely, Sokoloff, Taylor & Zafman (57) ABSTRACT

The invention applies to doubly resonant optical parametric oscillators comprising a non-linear crystal (4) through which pass a pump laser beam ($f_p$), a signal beam ($f_s$), and a complementary beam ($f_c$), and a device (5) that totally or partially reflects said beams emanating from the crystal such that, after reflection, they generate between them a relative phase-shifting value $\Delta\Phi^{ar}$ for a given functioning mode independent of the signal frequency or complementary frequency, and is characterized in that the reflecting device (5) is a metallic minor, or a combination of two scattering mirrors and a multilayer dielectric mirror placed downstream.

10 Claims, 7 Drawing Sheets

OTHER PUBLICATIONS

Desormeaux, A., et al., "Entangled cavity optical parametric oscillator: OPO supreme for spectroscopy in the mid-IR," 2005 Conference on Lasers and Electro-Optics (CLEO), (May 22, 2005) pp. 1960-1962.

Hebling, J., et al., "Mirror-dispersion-compensated femtosecond optical parametric oscillator," Optics Communications, vol. 141, No. 3-1 (Sep. 1, 1997) pp. 229-236.

Powers, P.E., et al., "Continuous tuning of a continuous-wave periodically poled lithium niobate optical parametric oscillator by use of a fan-out grating design," Optics Letters, vol. 23, No. 3 (Feb. 1, 1998) pp. 159-161.

Steinmeyer, G., "Femtosecond dispersion compensation with multilayer coatings: toward the optical octave," Applied Optics, vol. 45, No. 7 (Mar. 1, 2006) pp. 1484-1490.

Teja, J., et al., "Twin-beam generation in a triply resonant dual-cavity optical parametric oscillator," Optics Express, vol. 2, No. 3 (Feb. 2, 1998) pp. 65-71.

Vodopyanov, K.L., et al., "Optical parametric oscillation in quasi-phase-matched GaAs," Optics Letters, vol. 29, No. 16 (Aug. 15, 2004) pp. 1912-1914.

* cited by examiner

OPTICAL PARAMETRIC OSCILLATOR WITH ACHROMATIC PHASE-MAINTAINING PUMP RETURN

The present patent application is a non-provisional application claiming the benefit of International Application No. PCT/EP2007/056438, filed Jun. 27, 2007.

The present invention relates to parametric oscillators, essentially to optical parametric oscillators doubly resonant with return of the pump radiation.

Non-linear processes of the second order are used in optics to produce radiation at frequencies other than those emitted by a primary source. Accordingly, when the primary radiation is composed of two frequencies $f_1$ and $f_2$, it is possible to produce, by the sum of frequencies, radiation at the frequency $f_3$ such as $f_3=f_1+f_2$. Similarly, by difference of frequencies, a frequency $f_3$ such as $f_3=f_1-f_2$ ($f_1>f_2$) is obtained. It is also possible to envisage processes utilising a single primary frequency only, such as frequency doubling which is a process of the degenerated sum of frequencies such as ($f_1=f_2$), or parametric generation which is a frequency difference process for which the primary frequency radiation $f_1$ interacts with the noise of photons at the frequency $f_2$. In parametric generation, usage leads to calling the pump the primary radiation ($f_1=f_p$), and signal and complementary radiation the two other radiations involved ($f_2=f_c$ and $f_3=f_s$), with $f_s=f_p-f_c$ and by convention $f_s>f_c$.

These frequency conversion processes are generally used by propagating the different radiations via a non centro-symmetric crystal having optical non-linearity of the order of two. For frequency conversion to be efficacious the crystal is used under well-defined conditions (crystallographic orientation, temperature, . . . ) such that the radiation coming from the conversion of frequencies interferes constructively throughout their propagation in the non-linear crystal. The wave vectors of the different radiations involved in the frequencies conversion process thus verify a condition known as "phase tuning" which, in parametric generation, is written as: $k_p=k_s+k_c$ where $k_j$, is the wave vector associated with the radiation j. The phase tuning condition can be verified by using the properties of the birefringent crystals for which the optical index depends on polarisation. This is "phase tuning by birefringence".

However, so as not to be limited solely to birefringent crystals, other approaches such as "modal phase tuning" in guided structures or "quasi phase tuning" have been developed. With respect to quasi phase tuning which is currently the widest-spread approach, radiation propagation occurs via the non-linear material with the periodical subjecting of phase leaps. Most often, these leaps are produced each time the radiations have traveled a distance equal to a coherence length ($l_c$) where $l_c$ is defined as the length traveled by the three radiations so that their relative dephasing $\Delta\Phi$, given by: $\Delta\Phi=\phi_p-(\phi_s+\phi_c)$, changes from $\pi$, $\phi_j$ is the phase associated with radiation j. The "quasi phase tuning" condition is then written $k_p=k_s+k_c+k_l$ where $k_l$ is defined by $|k_l|=\pi/l_c$.

Figure 1:
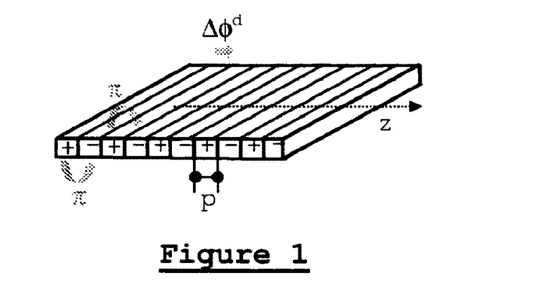
FIG. 1 illustrates the execution of the quasi phase tuning by periodic return of the ferro-electric domains.

Quasi phase tuning is currently widely applied to ferroelectric crystals such as LN (lithium niobate), LT (lithium tantalate), KTP (potassium titanyl phosphate) and its KTA isomorphs (potassium titanyl arsenate), RTA (rubidium titanyl arsenate). For these materials, phase leaps of $\pi$ can be obtained by periodically inverting the ferroelectric orientation of the material (see FIG. 1). The width of each ferroelectric domain, p, is fixed by construction at $l_c$ or at an odd multiple of $l_c$ such that the phase leap of $\pi$ which occurs during passage from one domain to the next cancels the relative dephasing $\Delta\Phi^d$, accumulated during propagation through each domain, which maintains constructive interference between the radiations coming from conversion of frequencies. The crystals which have been inverted periodically are noted according to the acronyms PPLN, PPKTP, . . . where PP signifies "Periodically Poled". Also, recent works have extended the technique of quasi phase tuning to semiconductors [K. L. Vodopyanov, O. Levi, P. S. Kuo, T. J. Pinguet, L. S. Harris, M. M. Fejer, B. Gerard, L. Becouarn, E. Lallier, "Optical parametric oscillation in quasi-phase-matched GaAs", Opt. Lett., 29, No. 16, pp. 1912-1914 (2004)].

Irrespective of the type of phase tuning employed, it is important to note that the same phase tuning or quasi phase tuning condition applies to the parametric generation process $f_p \to (f_s, f_c)$ and to that of the frequencies sum $f_s+f_c \to f_p$. The two processes can thus coexist a priori, even going as far as opposing one another in the non-linear crystal (phenomenon known as reconversion). In fact, at a given position z of the crystal, it is essentially the relative dephasing $\Delta\Phi(z)=\phi_p(z)-[\phi_s(z)+\phi_c(z)]$ where $\phi_j(z)$ is the phase of the radiation j to the abscissa z, which imposes the direction of energy transfer and finally the yield of the frequency conversion process.

As a consequence, when there is an attempt to boost the efficacy of a process, such as frequency doubling, by cascading several non-linear crystals, it is indispensable to insert between the different crystals phase adaptation devices for maintaining a relative phase between the radiations such that interaction is constructive in each crystal passed through [S. H. Chakmakjian, M. T. Gruneisen, K. W. Koch III, G. T. Moore, "Phased cascading of multiple non-linear optical elements for frequency conversion", U.S. Pat. No. 5,500,865, (1996)]. For use on an extended spectral domain phase adaptation must be verified irrespective of the frequency utilised and must be maintained achromatically. The devices are made from dispersive elements with prisms or diffraction networks inserted between the crystals mounted in cascade [B. Richman, "Achromatic phase matching at third orders of dispersion", U.S. Pat. No. 6,636,343 B1, (2003)].

Architectures associating crystals and prism or network systems working in cascade still have drawbacks: first they introduce losses and also are costly and bulky; their use is thus necessarily limited to a small number of crystals. Also, they have limited application to the process of frequency parametric generation where obtaining a conversion rate greater than 10%, necessary for most applications, results in having the radiations interact many times (>100, typically). Consequently, rather than having a large number of crystals in cascade, the approach retained in parametric generation consists of multiplying the number out-and-back paths through the same crystal. This crystal is placed inside an optical resonator in which the radiations make numerous out-and-back trips. The crystal inserted in its optical resonator forms a radiation source tunable in frequency, known as an optical parametric oscillator (OPO).

Figure 2:
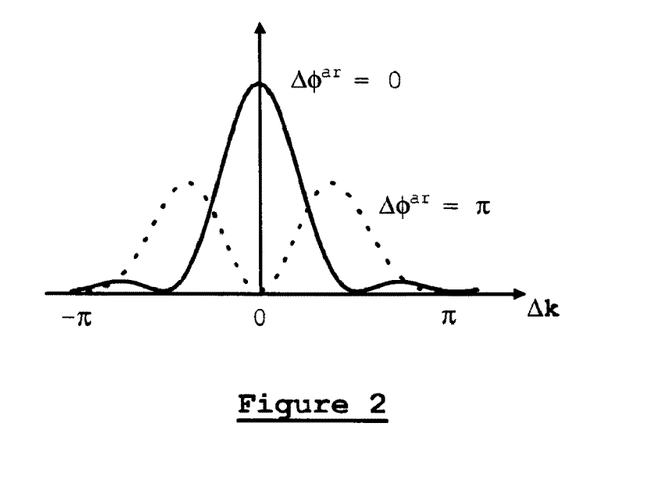

Optimising the conversion efficacy of an OPO supposes taking into account the value of the relative phase between the three radiations throughout their multiples paths in the resonator. This aspect is fundamental for a category of OPO known as "doubly resonant OPO with pump return" where the three radiations interact just as well on the out as on the back trip, conversion efficacy depending especially on the phase leap $\Delta\Phi^{ar}$ which is introduced between the three radiations during their reflection. The phase leap $\Delta\Phi^{ar}$ is defined by $\Delta\Phi^{ar}=\Delta\Phi^r-\Delta\Phi^a$ with $\Delta\Phi^r=\phi_p^r-(\phi_s^r+\phi_c^r)$ where the phases $\phi_j^r$ are measured at the level of the rear face of the crystal during the return paths and $\Delta\Phi^a=\phi_p^a-(\phi_s^a+\phi_c^a)$ where the phases $\phi_j^a$ are measured at the level of the rear face of the crystal during the out paths. The dependence of the conversion efficacy as a function of $\Delta\Phi^{ar}$ has been studied for crystals used in phase tuning by birefringence in [J. E. Bjorkholm, A. Askhin, R. G. Smith, "Improvement of optical parametric oscillators by non-resonant pump reflection", IEEE, J. of Quant. Electron., QE-6, No. 12, pp. 797-799, (1970)]. It has been demonstrated that the conversion efficacy of the OPO is maximal at exact phase tuning and for $\Delta\Phi^{ar}=0$ [modulo $2\pi$]. However, when $\Delta\Phi^{ar}=\pi$ [module $2\pi$], the efficacy is less than the exact phase tuning, while it has two maxima situated out of phase tuning. FIG. 2 illustrates this behaviour, known from the prior art. Accordingly, control and mastering of the value of $\Delta\Phi^{ar}$ optimise the functioning of a doubly resonant OPO with pump return. However, as emphasised also in [J. E. Bjorkholm, A. Askhin, R. G. Smith, "Improvement of optical parametric oscillators by non-resonant pump reflection", IEEE, J. of Quant. Electron., QE-6, No. 12, pp. 797-799, (1970)], the fact that the efficacy curve of the OPO depends on $\Delta\Phi^{ar}$ is a major drawback of the doubly resonant OPO with pump return, since it is necessary to control the value of $\Delta\Phi^{ar}$ as a function of the operating frequency of the OPO, which considerably complicates execution of this type OPO.

Accordingly, performances attained by the doubly resonant OPO with pump return can be very substantially improved by placing at the resonator exit a reflecting device with adapted phase ($\Delta\Phi^{ar}=0$ to produce maximum efficacy in exact phase tuning by birefringence), all [A. Bandilla, W. Brunner, R. Fischer, H. Paul, "Device for reducing pumping energy in the case of optical parametric oscillators", FR 2 093 928, (1971)] or part [M. Lefebvre, A. Desormeaux, E. Rosencher, "doubly resonant parametric oscillator with adapted pump return", WO 2005/11711 (A1), (2005)] of the pump radiation. However, given the optical index dispersion of dielectric multilayer mirrors used in pump return devices of the prior art, the value of the relative dephasing between the radiations $\Delta\Phi^{ar}$ depends on the stack of different dielectric layers and varies as a function of the operating frequency of the OPO. Otherwise expressed, maintaining $\Delta\Phi^{ar}$ is not achromatic. The same applies when a prism in total reflection is used [K. D. Zang, E. Margalith, "Broad tuning-range optical parametric oscillator", U.S. Pat. No. 6,295,160 (B1), (2001)] due to the optical dispersion of the material and the dephasing between the three radiations during internal reflections.

It is thus not possible to control, by construction, the value of $\Delta\Phi^{ar}$ and to ensure a priori that $\Delta\Phi^{ar}$ is maintained at its optimal value, irrespective of the frequency produced on exiting OPO. This is why, for controlling the value of $\Delta\Phi^{ar}$ and its evolution with the frequency, devices of the prior art have recourse to adjustment means a posteriori, such as for example a control loop of type PID (Phase, Integral, Derivative). Control of the relative phase between the different radiations necessitates using a separating device, prior to the return path, at least one of the three radiations involved in the process of parametric conversion, which increases the complexity of the source, boosts production costs and makes its execution and set-up more difficult.

It emerges from the preceding analysis that the doubly resonant OPO with pump return designed according to devices of the prior art are not fully satisfactory, since none has a simple and compact device for keeping the relative dephasing $\Delta\Phi^{ar}$ constant over an extended spectral domain. The present invention contributes a solution to the limitations of the prior art by implementing a pump return device with retention of achromatic phase such that $\Delta\Phi^{ar}$ is fixed at a value independent of the frequency by construction, that is, without having recourse to adjustment means during use.

A doubly resonant optical parametric oscillator with return of pump radiation according to the invention comprises, in the direction of the out propagation of the pump radiation, a non-linear crystal having a front face and a rear face, a device situated downstream of the rear face of the crystal, defining with a first mirror situated upstream of the front face of the crystal a first resonant cavity for the signal radiation and with a second mirror situated upstream of the front face of the crystal defining a second resonant cavity for the complementary radiation, one at least of the two cavities being of adjustable length to ensure an operating mode of the oscillator which is mono frequency or bi frequency, exclusively, the pump radiation at the frequency $f_p$ making through the crystal an out path entering via the front face of the crystal and exiting via the rear face of the crystal, then, after reflection on the device, a return path entering via the rear face of the crystal, the signal radiation at the frequency $f_s$, making numerous out-and-back paths in the first resonant cavity, the complementary radiation at the frequency $f_c$, making numerous out-and-back paths in the second resonant cavity, said three radiations exiting from the rear face of the crystal with relative dephasing $\Delta\Phi^a=(\phi_p^a-(\phi_s^a+\phi_c^a)$ and entering via the rear face of the crystal with relative dephasing $\Delta\Phi^r=\phi_p^r-(\phi_p^r+\phi_c^r)$ after reflection on the device, the value of the relative dephasing spread $\Delta\Phi^{ar}=\Delta\Phi^r-\Delta\Phi^a$ determining, for a given type of phase tuning, the mono frequency or bi frequency operating mode of the oscillator.

The oscillator is characterised in that the device is a metallic mirror common to the two cavities, due to which the value of the relative dephasing spread $\Delta\Phi^{ar}$ is equal to $\pi$ (mod. $2\pi$) irrespective of the operating frequency of the oscillator. The invention accordingly has a low production cost.

As a variant, the oscillator is characterised in that the device is a wide-band mirror common to the two cavities, constituted by a multilayer stack arranged to form a pair of dispersive dielectric mirrors and a standard dielectric mirror, due to which the value of the relative dephasing spread $\Delta\Phi^{ar}$ is constant irrespective of the operating frequency of the oscillator.

In a variant embodiment where one of the radiations is at a fixed frequency, the wide-band mirror is constituted by a stack of dielectric layers deposited on the same substrate to form a pair of dispersive mirrors of the type "double-chirped mirrors" [R. Szipocs, F. Krausz, "Dispersive dielectric mirror", U.S. Pat. No. 5,734,503, (1998)] associated with a standard dielectric multilayer mirror. The stack of dielectric layers of the pair of dispersive mirrors is carefully calculated and arranged so as to compensate optical dispersion between the two radiations of variable frequency, whereas the third radiation at a fixed frequency is reflected by the standard dielectric multilayer mirror. This assembly of dielectric layers can be partially reflecting to at least one of the pump, signal or complementary radiations.

Figure 3:
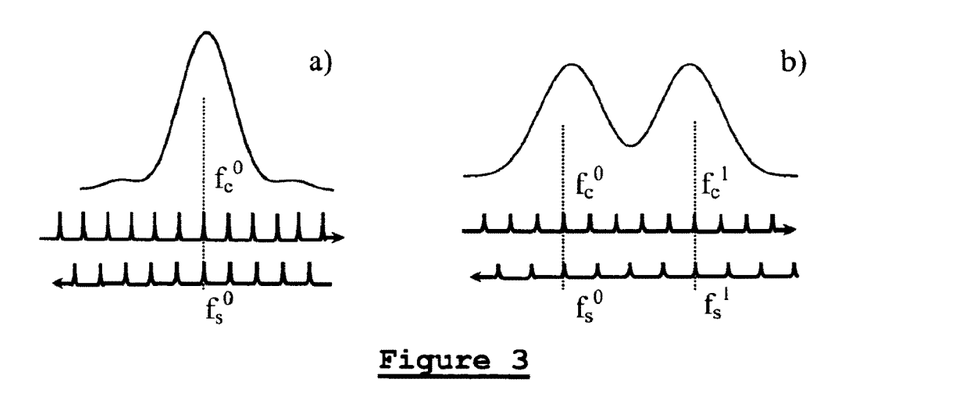
FIG. 3 illustrates the two operating modes a) (mono frequency) and b) (bi frequency) accessible by the invention.

Executing the invention takes full advantage of the fact that the signal and complementary waves oscillate in two distinct cavities whereof the lengths can be selected according to the preferred operating mode, as illustrated in FIG. 3. Accordingly, a first mono-frequency operating mode consists of selecting the lengths of the cavities so that there is just single mode coincidence between the two cavities placed at the centre of the parametric gain curve, as indicated in FIG. 3a. For this first operating mode, the characteristics of the wide-band mirror are fixed by construction so that the relative dephasing spread $\Delta\Phi^{ar}$ is such that the gain curve has only a single central maximum. In a second bi-frequency operating mode, the lengths of the cavities are selected so that there are two mode coincidences situated below each maximum of the parametric gain curve, as indicated in FIG. 3b. In this second operating mode, the relative dephasing spread $\Delta\Phi^{ar}$ is fixed by construction to obtain a gain curve with two maxima. This second operating mode simultaneously emits two close signal frequencies $f_s^o$ and $f_s^1$ with adjustable spacing as a function of the lengths of the two cavities.

The rear face of the crystal can ensure the pump return with retention of achromatic phase. In this case, the metallic coating or the dielectric layers of the dispersive mirrors is deposited directly onto the exit face of the non-linear crystal and form a single block with the crystal.

Advantageously, the non-linear crystal is used in quasi-phase tuning. The thickness of the last domain passed through is then fixed by construction according to the preferred operating mode.

The last domain of the crystal used in quasi phase tuning has a variable optical length so as to allow rapid selection of the operating mode of the OPO.

In another type of embodiment using the quasi phase tuning, the last domain passed through is of prismatic form in order to attain the different operating modes by simple translation of the crystal in a direction orthogonal to the pump radiation.

Accordingly, the doubly resonant OPO with pump return with retention of achromatic phase proposed in the invention substantially improves execution of these OPO by being freed up from the use of a control device of the relative phase between the radiations as a function of the frequency produced by the OPO. Its execution in combination with two distinct cavities for the signal and complementary waves produces two mono frequency or bi-frequency operating modes where the signal radiation comprises either a single frequency $f_s^o$ or two close frequencies $f_s^o$ and $f_s^1$, the latter operating mode proving particularly useful when the aim is to measure differential absorption, for example.

Other characteristics and advantages of the invention will emerge from the following description and the non-limiting examples.

The attached drawings illustrate the invention.

The curves of FIG. 2 illustrate the dependence on the efficacy of parametric conversion as a function of the phase detuning between the wave vectors $\Delta k=k_p-(k_s+k_c)$, for two values of the relative dephasing $\Delta\Phi^{ar}$; these curves are obtained for a phase tuning by birefringence.

Figure 4:
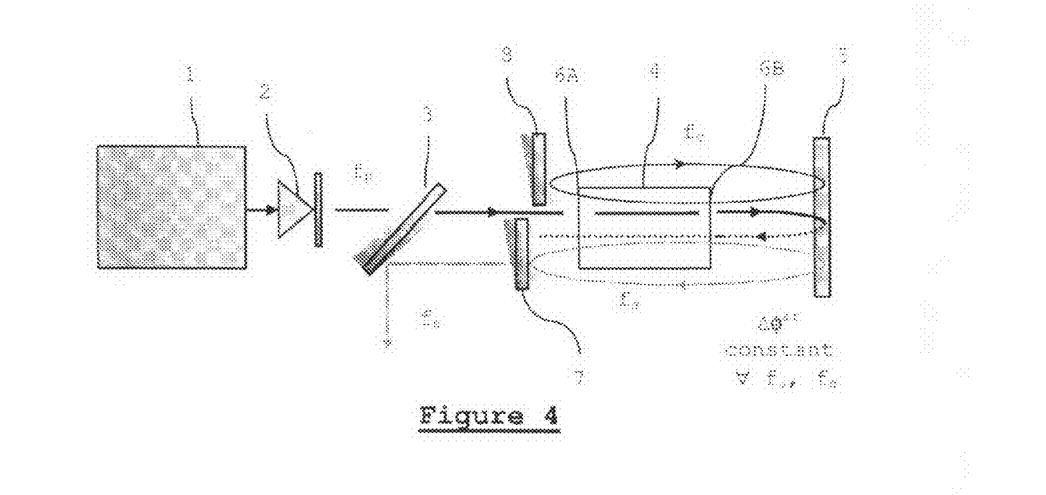
FIG. 4 schematically illustrates the execution of the invention.

A general schema of the execution of the invention is given in FIG. 4. The laser 1 delivers the pump radiation of frequency $f_p$ which successively passes through an optical isolator 2, a separating blade 3 then mirrors 7 or 8 and a non-linear crystal 4 via the inlet (6A) and outlet (6B) faces, the signal frequency radiation $f_s$ and the complementary frequency radiation $f_c$ effecting numerous out-and-back paths through the crystal 4 by reflection between the wide-band mirror common 5 and the mirrors 7 and 8, respectively. The pump, signal and complementary radiations are reflected totally or partially when leaving the crystal. Reflection of the three radiations is ensured by a common wide-band mirror which maintains a dephasing value $\Delta\Phi^{ar}=\Delta\Phi^r-\Delta\Phi^a$ between the relative phase ($\Delta\Phi^a$) of the three out radiations and the relative phase ($\Delta\Phi^r$) of the three reflected radiations, independent of the signal or complementary radiation. The signal radiation at the frequency $f_s$, is available upstream of the OPO, after having been filtered from the pump radiation not converted by means of the blade 3.

Figure 5:
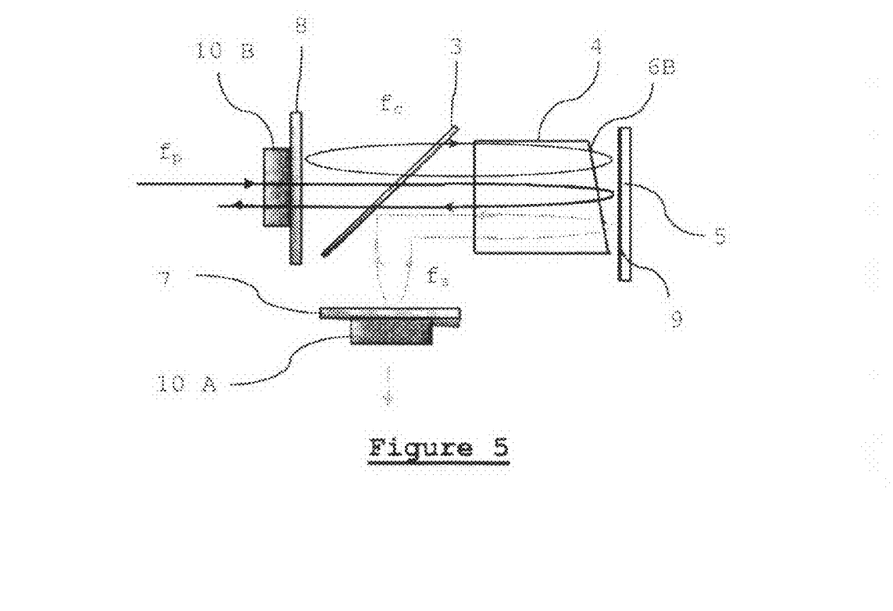
FIG. 5 is relative to an execution of the invention for doubly resonant OPO functioning in phase tuning by birefringence and using two separate cavities, arranged according to folded geometry.

FIG. 5 illustrates initial execution of the invention in geometry folded. Reflection of the three radiations is assured by metal depositing 9 of a few micrometers in thickness placed near the exit face 6B of the non-linear crystal 4. The complementary radiation oscillates between the mirror 8 and the metallic surface 9, whereas the signal radiation oscillates between the mirror 7 and the metallic surface 9. The mirrors 7 and 8 are mounted on piezoelectric shims 10A and 10B so as to separately change the lengths of the optical cavities and thus fine-tune the frequency delivered by the OPO. The pump, signal and complementary radiations interact in the common part of the resonator containing the non-linear crystal 4 used here in phase tuning by birefringence. Inside the cavity, the separating blade 3 ensures separation of the signal and complementary radiations. The exit face 6B is oriented in such a way that the angle of incidence of the signal and complementary radiations is the closest possible to that of the Brewster incidence so as to limit Fresnel losses without resorting to anti-reflective processing which would introduce dephasing between the variable radiations with the frequency (chromatism). In these conditions, and given the weak optical dispersion of the air space separating the surface 6B from the surface 9, the value of the relative dephasing $\Delta\Phi^{ar}$ is simply equal to the relative dephasing spread which appears between the out-and-back waves ($\Delta\Phi^r-\Delta\Phi^a$) during metallic reflection of the three radiations on the surface 9.

Figure 6:
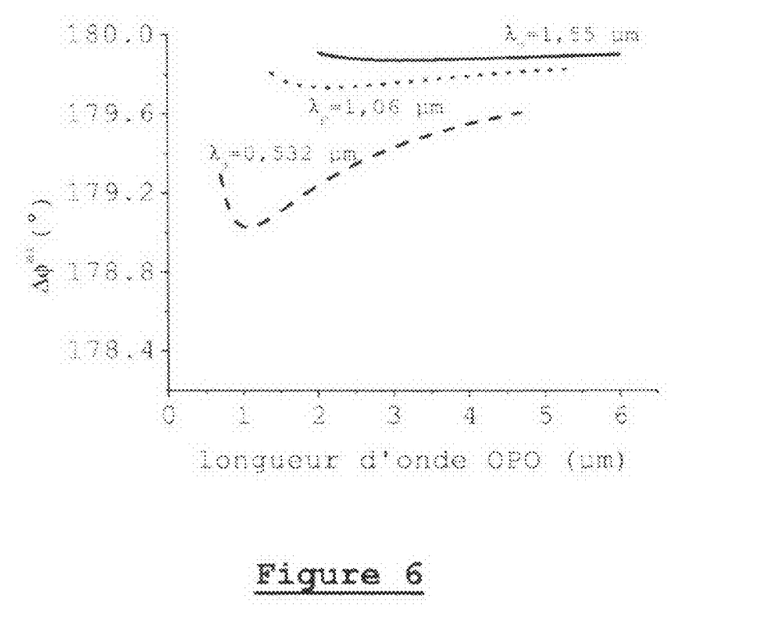
FIG. 6 illustrates the evolution of the variation of the relative dephasing $\Delta\Phi^{ar}$ between the pump, signal and complementary radiations during reflection on an air/aluminium interface as a function of the signal or complementary wavelength. The different curves have been calculated for different pump wavelengths: 1.55, 1.06 and 0.532 μm.

In order to specify the operating mode of the OPO as in FIG. 5, the metallic mirror 9 is made by aluminium deposit. Evolution of the relative dephasing $\Delta\Phi^{ar}$ as a function of the frequency (signal or complementary) emitted by the OPO can be calculated using the values of the indices given in [D. Y. Smith, E. Shiles, M. Inokuti, "The optical properties of Aluminium", in E. D. Palik (ed.), Handbook of optical constants of solids, Academie Press, Orlando, 369 (1985)]. To cover a wide frequency range, three usual wavelengths of pump radiation are considered non exclusive: 1.55 μm, 1.064 μm and 0.532 μm. FIG. 6 clearly shows that for the different pump wavelengths $\Delta\Phi^{ar}$ remains close to π, irrespective of the frequency emitted by the OPO, which demonstrates the preferred achromatic character in the invention. Given that the crystal here is used in phase tuning by birefringence and that $\Delta\Phi^{ar} \approx \pi$, the efficacy curve of the OPO has two maxima placed symmetrically on either side of the exact phase tuning, as in FIG. 2. The lengths of the signal and complementary cavities can be regulated independently so as to produce resonances located at the position of the two maxima and thus attain the second operating mode b) introduced in FIG. 3.

Figure 7:
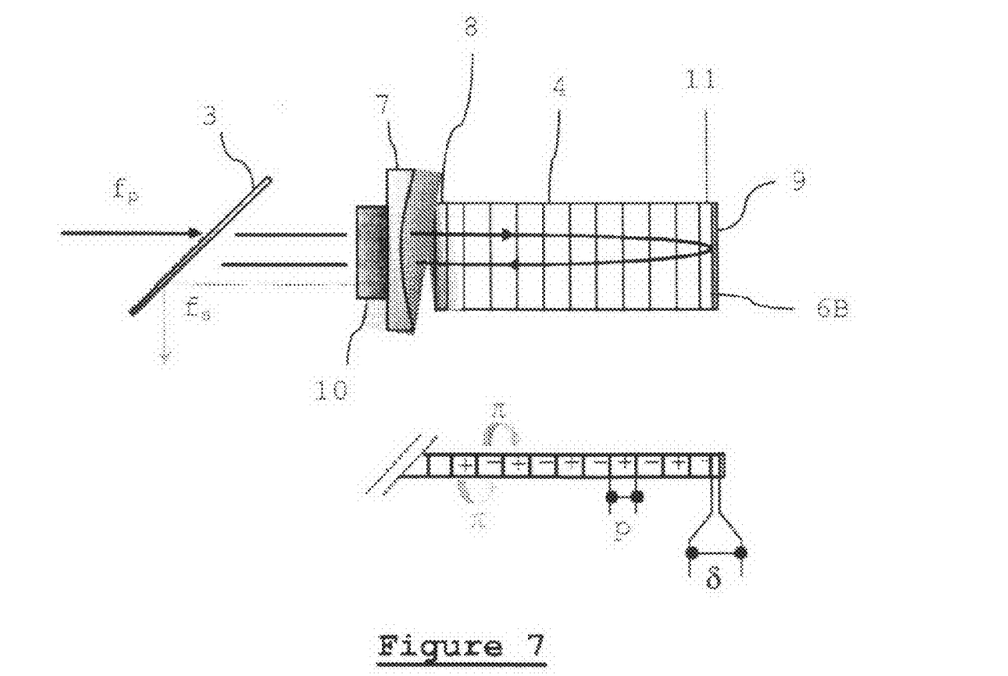
FIG. 7 illustrates execution of the invention for a crystal used in quasi phase tuning and two separate cavities, in linear geometry.

FIG. 7 illustrates a first type of embodiment of the invention taking advantage of the specific properties of the crystals used in quasi-phase tuning. According to FIG. 7, the signal radiation oscillates between the mirrors 7 and 9, whereas the complementary radiation oscillates between the mirrors 8 and 9, these mirrors here forming a linear resonator with imbricated cavities. The signal radiation is extracted through the mirror 7 before being filtered from the pump radiation by means of the separating blade 3. The metallic mirror 9 is directly placed on the exit face 6B of the last return domain 11. The arrangement is characterised in that the width (δ) of the last domain passed through is fixed by construction more or less by abrading the surface 6B according to the preferred operating mode. After passing through the last return domain 11 and reflection on the metallic mirror 9, the three radiations interact on return in the non-linear crystal 4 with a relative dephasing $\Delta\Phi = \Delta\Phi^{ar} + 2\Delta\Phi^{d}(\delta)$ where the out-and-back paths through the domain 11 have been taken into account.

Figure 8:
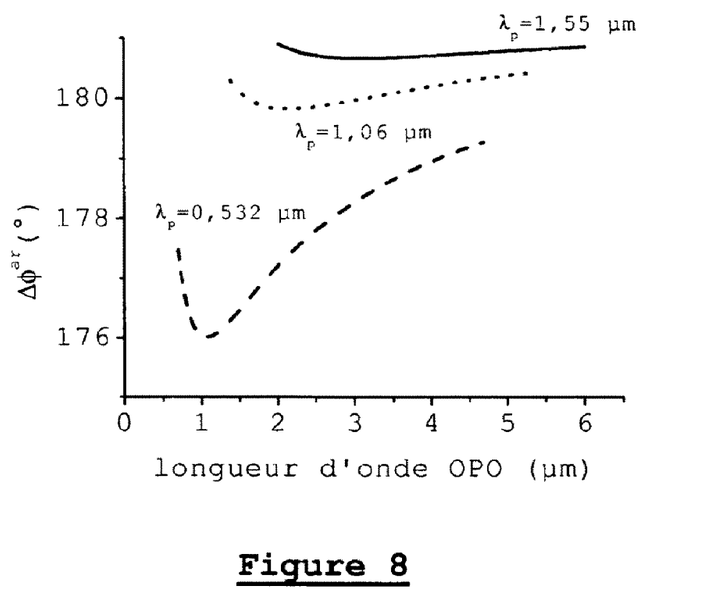
FIG. 8 illustrates the evolution of the relative dephasing $\Delta\Phi^{ar}$ between the pump, signal and complementary radiations during reflection on a lithium/aluminium niobate interface as a function of the signal or complementary wavelength. The different curves have been calculated for different pump wavelengths: 1.55, 1.06 and 0.532 μm.

Accordingly, the value of $\Delta\Phi$ can be adjusted continuously during construction according to the value of δ selected. Considering as previously a metallic mirror made by aluminium deposit and supposing that the non-linear crystal 4 is formed from PPLN, it is possible to calculate from the values of the indices given in [D. H. Jundt, "Temperature-dependent Sellmeier equation for the index of refraction, n, in congruent niobate", Opt. Lett., 22, 1553 (1997)], the relative dephasing $\Delta\Phi^{ar}$ associated with a lithium/aluminium niobate interface. As shown in FIG. 8, the value of $\Delta\Phi^{ar}$ remains close to π irrespective of the operating frequency of the OPO and for the different pump wavelengths considered. In these conditions, the radiations interact on return in the crystal with a given relative phase by $\Delta\Phi \approx \pi + 2\Delta\Phi^{d}(\delta)$. This relation further remains valid for other interfaces associating materials such as PPKTP, PPKTA, . . . and different metallic coatings (Au, Ag, Cr, . . . ). The two operating modes can thus be obtained according to the value of δ:

If $\delta = n \times l_c$ where n is an odd whole $\geq 1$, then $\Delta\Phi$ will be equal to π [modulo 2π] and the parametric conversion will be maintained on return without discontinuity of phase leaps of π between the successive ferroelectric domains. In this situation, efficacy of the parametric conversion is optimal over the entire range of functioning of the OPO defined by the value of $l_c$ and the temperature of the crystal. The efficacy curve has a symmetrical "bell" form. The lengths of the signal and complementary cavities are thus selected to obtain the operating mode a) of FIG. 3.

If $\delta = (n+0,5) \times l_c$, then $\Delta\Phi$ is equal to 0 [modulo 2π]. In this situation, the efficacy curve has a "double bulge" which is favourable to producing functioning at two wavelengths. The lengths of the signal and complementary cavities are selected to produce the operating mode b) of FIG. 3.

For intermediate values of δ, a dissymmetric form of the "double bulge" efficacy curve can be obtained, which results in emission of two wavelengths having different intensities.

Therefore, according to the type of embodiment illustrated schematically by FIG. 7, a doubly resonant OPO with pump return with retention of achromatic phase can be obtained. By construction, the value of the relative dephasing between the three radiations interacting on return in the crystal ($\Delta\Phi$) can be fixed as a function of the preferred operating mode and the lengths of the cavities selected as a consequence. Given the achromatic character of the device, electronic control of the phase is no longer necessary. Also, metal depositing 9 can be done for a cost well below that associated with dielectric multilayer deposit processes.

Since the inventive device does not require any control to keep the value of $\Delta\Phi^{ar}$ constant over a wide frequency range, the change in operating mode of the oscillator becomes possible by modifying the length δ of the last domain.

Figure 9:
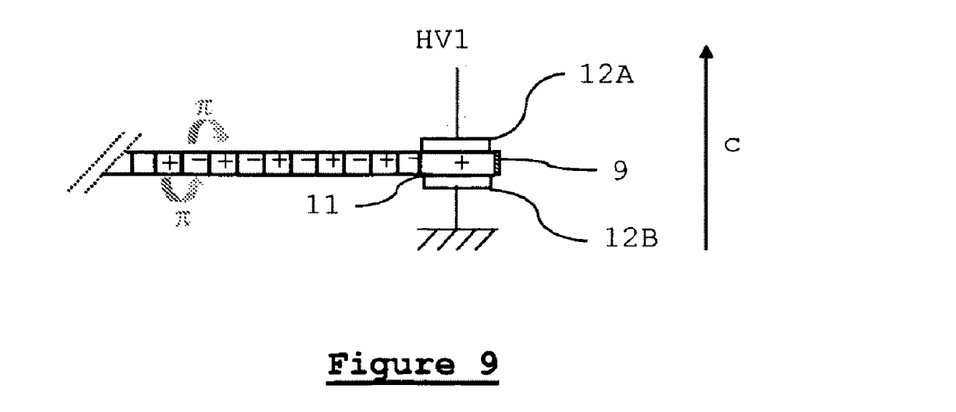
FIG. 9 illustrates execution of the invention in quasi phase tuning with the possibility of electrically selecting the operating mode of the OPO.

FIG. 9 shows a second type of embodiment using a PPLN crystal in quasi phase tuning with the possibility of electrically selecting the value of $\Delta\Phi^{ar}$. For this, the last return domain 11 has a sufficiently significant width δ (ten millimetres, typically) such that it is possible via electro-optical effect to substantially modify its optical length over several μm and thus the operating mode of the OPO. Two electrodes 12A and 12B are placed on either side of the domain 11 for supplying an electrical field according to the crystallographic axis c of the crystal. Regulating the value of the HV1 voltage applied to the electrodes 12A and 12B enables the relative dephasing $\Delta\Phi$ to be modulated very rapidly on return and thus the operating mode of the OPO to be changed while retaining the achromatic character of the phase return.

Figure 10:
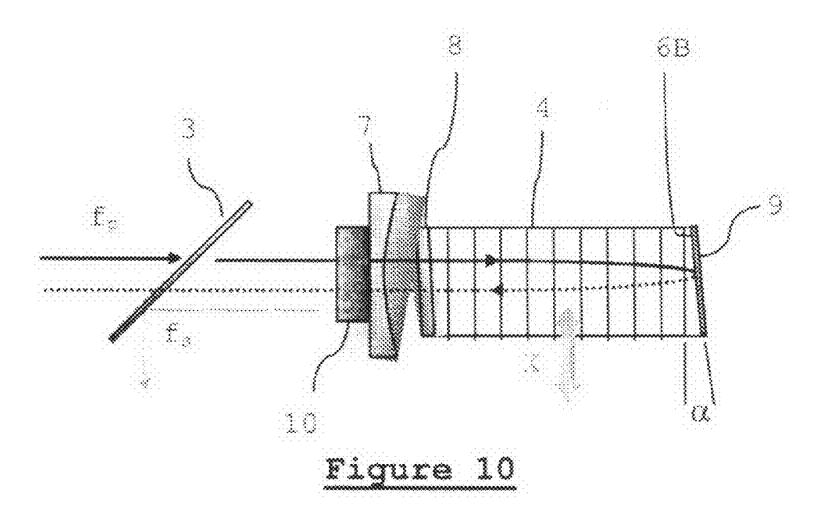
FIG. 10 illustrates execution of the invention in quasi phase tuning with the possibility of fixing the operating mode of the OPO by translation of the non-linear crystal.

FIG. 10 shows another type of embodiment of the invention which is characterised by the fact that the surface 6B has been polished with an angle of inclination a (of the order of a few mrad) relative to the orientation of the ferroelectric domains such that the value of the relative dephasing $\Delta\Phi^{d}$ can be modified according to the lateral position of the crystal relative to the pump radiation. This type of embodiment which is applied to crystals used in quasi-phase tuning selects the form of the efficacy curve and thus changes the operating mode of the OPO by simple translation of the crystal according to the direction X.

The advantage of the different types of embodiment described hereinabove is low production costs from using a metallic coating. However, the parameters (module and phase) of the metallic reflection are barely modifiable. To control the value of these parameters, while retaining the preferred achromatic character, the three radiations will advantageously be reflected by a wide-band mirror made from a combination of dispersive dielectric mirrors of "double chirped" type associated with a standard dielectric mirror. The dispersive dielectric mirrors, the main properties of which are detailed in [G. Steinmeyer, "Femtosecond dispersion compensation with multilayer coatings: toward the optical octave", Appl. Opt., 45, n° 7, 1484 (2006)], have been developed in particular for production of very brief optical pulses, on the femtosecond scale. They have especially been used to compensate the optical dispersion of group speed in the OPO crystals simply resonant functioning with an annular cavity and under synchronous impulsive pumping, see [J. Hebling, H. Giessen, S. linden, J. Khuhl, "Mirror-dispersion-compensated femtosecond optical parametric oscillator", Opt. Comm., 141, 229 (1997)]. The production of shorter and shorter pulses has contributed widely to the development of these mirrors with a view to controlling the group delay dispersion of a luminous pulse, a quantity which depends on the derivative second of the phase as a function of the pulsation $$\left(\frac{\partial^2 \varphi}{\partial \omega^2}\right).$$

The search for the achromatic character proposed in the invention comes back to being placed in conditions such as phase variation $$\left(\frac{\partial \varphi}{\partial \omega}\right)$$

between the radiations or a linear function of the frequency. This leads to searching for devices such as $$\left(\frac{\partial^2 \varphi}{\partial \omega^2}\right)$$

or independent of ω, thus using a particular combination of dispersive mirrors.

Figure 11:
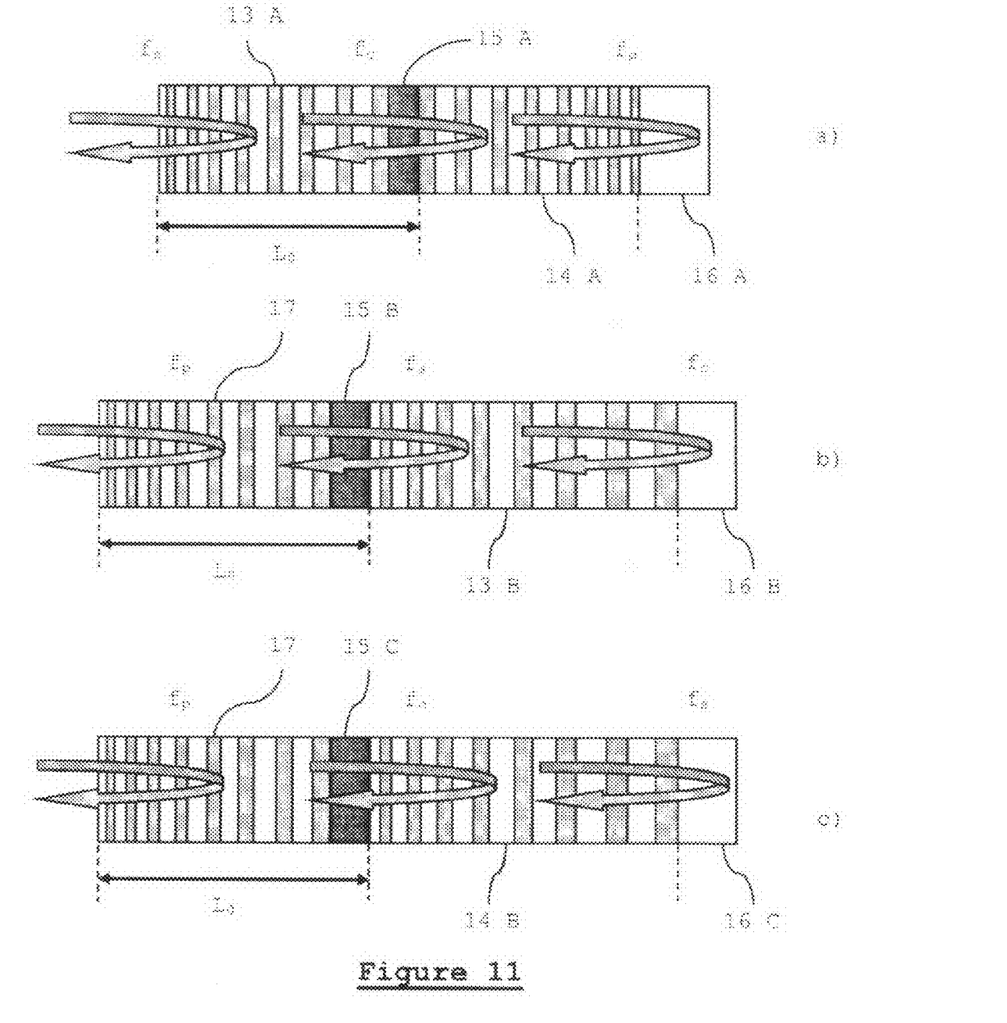
FIG. 11 illustrates three wide-band mirrors made from different arrangements of dispersive mirrors and multilayer mirrors ensuring pump return with retention of achromatic phase.

FIG. 11 shows three possible wide-band mirrors made by combining dispersive dielectric mirrors and a standard multilayer mirror, depending on whether the pump frequency is tunable or not:

the arrangement a) of FIG. 11 is composed of two dispersive mirrors of "double chirped" type 13A and 14A and a standard multilayer mirror 16A. The mirror 16A is designed to totally or partially reflect the pump radiation whereof the frequency is supposed fixed, whereas the dispersive mirrors 13A and 14A respectively reflect the signal and complementary radiations. For this type of functioning where the signal and complementary frequencies are continuously tunable, the mirrors 13A and 14A have opposite group delay dispersions. The distance $L_0$ between the mirrors 13A and 14A is fixed by adjusting the thickness of the layer 15A during the procedure for depositing the dielectric layers. The spectral characteristics of the dispersive mirrors (reflection range, group delay dispersion) and the distance $L_0$ are fixed such that, on reflection, the sum of the phase leaps $\phi_s^{ar}+\phi_c^{ar}=(\phi_s^r-\phi_s^a)+(\phi_c^r-\phi_c^a)$ has a value independent of the signal and complementary frequencies. In these conditions and given that the pump frequency is fixed, relative dephasing $\Delta\Phi^{ar}$ between the radiations is kept constant throughout reflection. Given that the spectral characteristics of the dispersive mirrors can be controlled over very extended ranges (up to one octave), the pump return with retention of achromatic phase is ensured over a wide spectral domain.

the arrangement b) is intended for a type of operation at fixed complementary frequency. In this case the standard multilayer mirror 16B totally or partially reflects the complementary radiation, whereas the dispersive mirrors 13B and 17 reflect the signal and pump radiations, of tunable frequencies. The spectral characteristics of the dispersive mirrors 13B and 17 as well as the thickness of the layer 15B are now selected so that, on reflection, the phase difference $\phi_p-\phi_s$ does not depend on the pump and signal frequencies. In these conditions and given that the complementary frequency is kept fixed, relative dephasing $\Delta\Phi^{ar}$ between the radiations is kept constant throughout reflection.

the arrangement c) is intended for a fixed signal type of operation. It is distinguished from case b) by the fact that the complementary radiation is reflected by a dispersive mirror 14B, whereas the signal is reflected totally or partially by the standard dielectric mirror 16C. As previously, it is possible to fix the spectral characteristics of the mirrors 17 and 14B as well as the thickness of the layer 15C to make the relative dephasing $\Delta\Phi^{ar}$ independent of the pump and complementary frequencies.

For these different arrangements, a simplified model specifies the conditions to be satisfied to produce, on reflection, maintaining the relative dephasing $\Delta\Phi^{ar}$.

Let $\phi_j^{ar}$ be the dephasing between the out and back path of radiation j reflected on one of the different arrangements of FIG. 11. Based on a simple model, the aim is to specify the value of relative dephasing $\Delta\Phi^{ar}=\phi_p^{ar}-(\phi_s^{ar}+\phi_c^{ar})$ which appears between the pump, signal and complementary radiations during reflection and deduces therefrom conditions to be satisfied for producing functioning with pump return with retention of achromatic phase.

With respect to the arrangement a) of FIG. 11, given that the pump frequency is supposed fixed, the reflection phase change is constant, $\phi_p^{ar}=\phi_p^0$ being the value of this changed phase. The signal and complementary radiation phases are written, respectively:

$$\varphi_s^{ar} = \frac{2\omega_s \bar{n}_s}{c} L(\omega_s) \quad \text{et} \quad \varphi_c^{ar} = \frac{2\omega_c}{c}[L_0 + \bar{n}_c L(\omega_c)].$$

In these two expressions $\omega_j$ is the pulsation of the radiation j; c is the speed of light; $n_j$ is the average index seen by the radiation j as it crosses through the different layers of high $n^H$ and low $n^B$ index which compose the dispersive mirror $$\left(\bar{n}_j = \frac{n_j^H + n_j^B}{2}\right);$$

$L_0$ is the optical thickness traversed by the complementary radiation before reaching the complementary dispersive mirror; $L(\omega_j)$ is the depth of penetration of the radiation j through the dispersive mirror reflecting this radiation j. For a linear variation of the depth of penetration as a function of $\omega_j$, $L(\omega_j)$ there is:

$$L(\omega_j) = \frac{c}{4\bar{n}_j} D_j(\omega_j - \Omega_0^j)$$

where $\Omega_0^j$ is the lower limit of the reflection range of the dispersive mirror reflecting the radiation j; $D_j$ is the group delay dispersion of the radiation j, defined by $$D_j = \frac{\partial^2 \varphi_j}{\partial \omega_j^2}.$$

Relative dephasing $\Delta\Phi^{ar}$ is thus given by $$\Delta\Phi^{ar} = \varphi_p^0 - \left[\frac{\omega_s}{2}D_s(\omega_s - \Omega_0^s) + \frac{2L_0}{c}\omega_c + \frac{\omega_c}{2}D_c(\omega_c - \Omega_0^c)\right]$$

The conditions of the pump return with retention of achromatic phase are verified when the derivative relative to $\omega_s$ and $\omega_c$ of the quantity between hooks is zero, giving the following conditions:

$$D_s + D_c = 0,$$
$$\Omega_0^s + \Omega_0^c = \omega_F, \text{ et}$$
$$L_0 = \frac{\omega_p D_s c}{4}.$$

These equalities show that the dispersive mirrors reflecting the signal and complementary radiations must have opposite group delay dispersion so as to be compensated when the signal and complementary frequencies vary. The distance $L_0$ depends on the spectral characteristics of the dispersive mirrors. By way of example, if the group delay dispersion of the signal radiation ($D_s$) is 100 fs$^2$, then, for a pump frequency of 1 μm, $L_0 \sim 15$ μm.

With respect to the arrangement b) of FIG. 11, by following the procedure hereinabove, the achromatism conditions are:

$$D_s - D_p = 0,$$
$$\Omega_0^p - \Omega_0^s = \omega_p, \text{ et}$$
$$L_0 = \frac{\omega_c D_p c}{4}.$$

This time, given that the signal and pump frequencies vary in the same direction, the two dispersive mirrors will have the same group delay dispersion.

Equivalent relations are obtained for the arrangement c) of FIG. 11.

Figure 12:
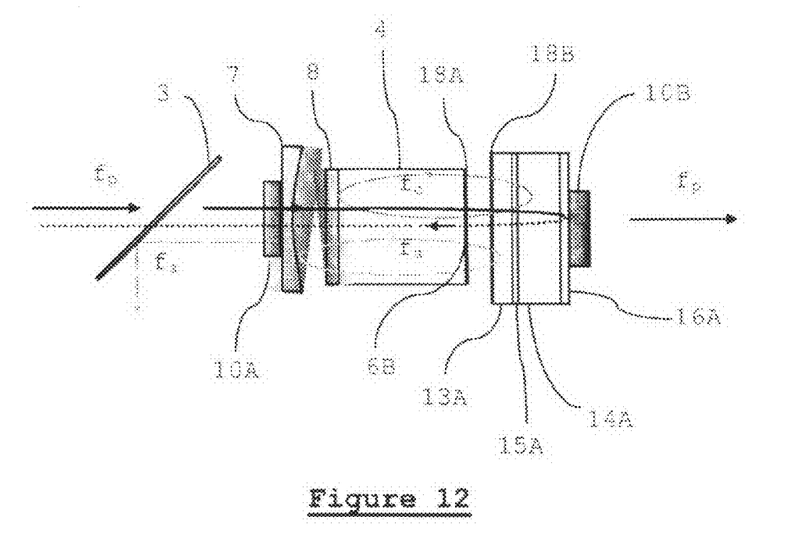
FIG. 12 illustrates execution of the invention using a combination of the two dispersive mirrors and a multilayer mirror with partial reflection of the pump radiation.

Of course, using the different wide-band mirrors of FIG. 11 naturally applies to the preceding types of embodiment using metallic reflection with the advantage of being able to fix the reflection coefficient and relative dephasing $\Delta\Phi^{ar}$ of the different radiations. This possibility allows envisaging operating modes that were not accessible via simple metallic reflection. Accordingly, the FIG. 12 has an operating mode using a birefringent crystal 4 and a wide-band mirror designed according to the arrangement a) of FIG. 11. The signal and complementary radiations oscillate respectively between the pairs of mirrors 7-13A and 8-14A where 13A and 14A are dispersive mirrors. The pump radiation is reflected by the multilayer mirror 16A which is partially reflecting at the pump frequency. According to [M. Lefebvre, A. Desormeaux, E. Rosencher, "Doubly resonant parametric oscillator with adapted pump return", WO 2005 111711 (A1), (2005)], the reflection coefficient at the pump frequency is of the order of 20%. Two piezoelectric shims 10A and 10B help finely modify the lengths of the signal and complementary cavities so as to tune the frequency emitted by the OPO. Also, the exit face 6B of the crystal as well as the dispersive mirror 13A are coated with anti-reflective layers 18A and 18B to limit Fresnel losses and the parasite Fabry Perot effects between the surface 6B and the external face of the mirror 13A.

Figure 13:
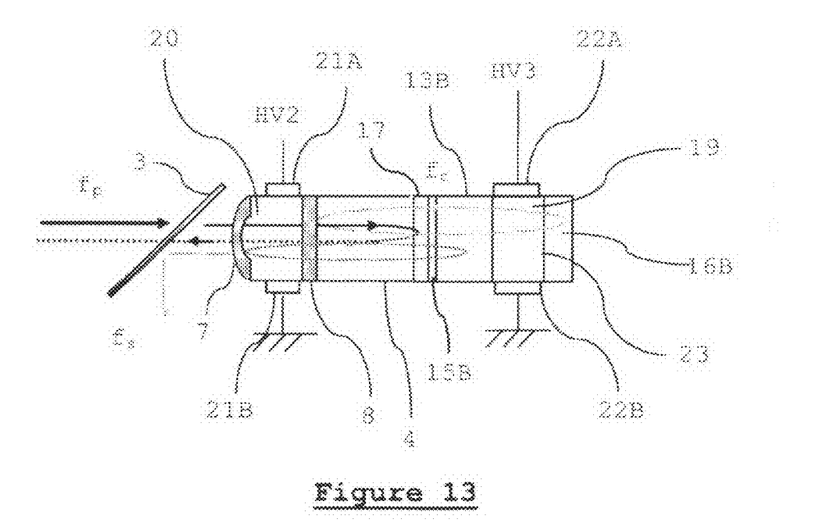
FIG. 13 illustrates monobloc realisation of the invention using two dispersive mirrors and a multilayer mirror separated by a disc of variable optical length.

FIG. 13 has a type of monobloc embodiment employing the arrangement b) of FIG. 11. The signal radiation oscillates between the mirrors 7 and 13B whereas the complementary radiation oscillates between the mirrors 8 and 16B and the pump radiation is reflected by the dispersive mirror 17. The mirror 7 is partially reflecting at the signal to ensure coupling to external use. A disc 20, constituted by electro-optical material is inserted between the mirrors 7 and 8. It is thus possible to modify the optical length of the signal cavity and consequently the signal frequency by applying high voltage HV2 by means of the two electrodes 21A and 21B placed on either side of the disc 20. To obtain continuous tuning of the signal, the pump frequency itself is tunable. It can be produced by a fibre laser, for example. In the type of embodiment of FIG. 13, the dielectric mirror 16B is placed on the external face 23 of an electro-optical disc 19. This disc 19 is placed directly on the dispersive mirror 13B following techniques of adherence and sticking known from prior art. Two electrodes 22A and 22B are placed on either side of the disc 19 to apply high voltage HV3 which modifies the optical length of the disc 19 and thus relative dephasing of the complementary radiation relative to the pump and signal radiation.

In this way, the value of the relative dephasing $\Delta\Phi^{ar}$ can be changed very rapidly, which permits to vary the operating mode of the OPO according to the specific application.

Of course, the types of embodiment proposed do not represent an exhaustive list of possible embodiments.

The invention claimed is:

1. A doubly resonant optical parametric oscillator with return of the pump radiation comprising, in the direction of out propagation of the pump radiation,
    a non-linear crystal (4) having a front face (6A) and a rear face (6B),
    a device (5) situated downstream of the rear face (6B) of the crystal, defining with a first mirror (7) situated upstream of the front face (6A) of the crystal a first resonant cavity for the signal radiation and with a second mirror (8) situated upstream of the front face (6A) of the crystal defining a second resonant cavity for the complementary radiation, one at least of the two cavities being of adjustable length to ensure an operating mode of the oscillator which is one of mono-frequency and bi-frequency,
    the pump radiation at the frequency $f_p$ making an out path entering via the front face (6A) of the crystal through the crystal (4) and exiting via the rear face (6B) of the crystal, then, after reflection on the device (5), a return path entering via the rear face (6B) of the crystal, the signal radiation at the frequency $f_s$, making out-and-back paths in the first resonant cavity,
    the complementary radiation at the frequency $f_c$, making out-and-back paths in the second resonant cavity,
    said three radiations exiting from the rear face of the crystal (6B) with relative dephasing $\Delta\Phi^a = \phi_p^a - (\phi_s^a + \phi_c^a)$ and entering via the rear face of the crystal (6B) with relative dephasing $\Delta\Phi^r = \phi_p^r - (\phi_s^r + \phi_c^r)$ after reflection on the device (5), the value of the relative dephasing spread $\Delta\Phi^{ar} = \Delta\Phi^r - \Delta\Phi^a$ determining, for a given type of phase tuning, the mono-frequency or bi-frequency operating mode of the oscillator,
    wherein the device (5) is a metallic mirror common to the two cavities, due to which the value of the relative dephasing spread $\Delta\Phi^{ar}$ is equal to $\pi$ (mod. $2\pi$) irrespective of the operating frequency of the oscillator; and
    wherein $\phi_p^a$ is the phase of the pump radiation measured at the level of the rear face of the crystal (4) during the out paths;

$\phi_s^a$ is the phase of the signal radiation measured at the level of the rear face of the crystal (4) during the out paths;

$\phi_c^a$ is the phase of the complementary measured at the level of the rear face of the crystal (4) during the out paths;

$\phi_p^r$ the phase of the pump radiation measured at the level the rear face of the crystal (4) during the return paths;

$\phi_s^r$ is the phase of the signal radiation measured at the level of the rear face of the crystal (4) during the return paths; and $\phi_c^r$ is the phase of the complementary radiation measured at the level of the rear face of the crystal (4) during the return paths.

2. The doubly resonant optical parametric oscillator as claimed in claim 1, wherein the rear face of the crystal (6B) is inclined according to the Brewster incidence, due to which Fresnel losses are limited.

3. The parametric oscillator as claimed in claim 1, wherein the non-linear crystal is used in quasi phase tuning and the last domain (11) has a variable optical length due to which the operating mode is changeable.

4. The parametric oscillator as claimed in claim 3, wherein the variable optical length originates from the prismatic form of the last domain, due to which the operating mode is changeable by translation of the crystal in a direction orthogonal to the pump radiation.

5. The parametric oscillator as claimed in claim 3, wherein an electrical field is applied along the crystallographic axis of the crystal to vary the optical length.

6. A doubly resonant optical parametric oscillator with return of the pump radiation comprising, in the direction of out propagation of the pump radiation, a non-linear crystal (4) having a front face (6A) and a rear face (6B), a device (5) situated downstream of the rear face (6B) of the crystal, defining with a first mirror (7) situated upstream of the front face (6A) of the crystal a first resonant cavity for the signal radiation and with a second mirror (8) situated upstream of the front face (6A) of the crystal a second resonant cavity for the complementary radiation, one of at least of the two cavities being of adjustable length for ensuring an operating mode of the oscillator which is one of mono-frequency and bi-frequency, the pump radiation at the frequency $f_p$ making through the crystal (4) an out path entering via the front face (6A) of the crystal and exiting via the rear face (6B) of the crystal, then, after reflection on the common mirror, a return path entering via the rear face (6B) of the crystal, the signal radiation at the frequency $f_s$, making out-and-back paths in the first resonant cavity, the complementary radiation at the frequency $f_c$, making out-and-back paths in a second resonant cavity, said three radiations exiting from the rear face of the crystal (6B) with relative dephasing $\Delta\Phi^a=\phi_p^{r-(\phi_s^r+\phi_c^r)}$ and entering via the rear face of the crystal (6B) with relative dephasing $\Delta\Phi^r=\phi_p^r-(\phi_s^r+\phi_c^r)$ after reflection on the device (5), the value of the relative dephasing spread $\Delta\Phi^{ar}=\Delta\Phi^a$ determining, for a given type of phase tuning, the mono frequency or bi-frequency operating mode of the oscillator, wherein the device (5) is a wide-band mirror common to the two cavities, comprising a multilayer stack arranged to form a pair of dispersive dielectric mirrors and a standard dielectric mirror, due to which the value of the relative dephasing spread $\Delta\Phi^{ar}$ is constant irrespective of the operating frequency of the oscillator; and wherein $\phi_p^a$ is the phase of the pump radiation measured at the level of the rear face of the crystal (4) during the out paths;

$\phi_s^a$ is the phase of signal radiation measured at the level face of the crystal (4) during the out paths;

$\phi_c^a$ is the phase of the complementary measured at the level of the rear face of the crystal (4) during the out paths;

$\phi_p^r$ is the phase of the pump radiation measured at the level of the rear face of the crystal (4) during the return paths;

$\phi_s^r$ is the phase of the signal radiation measured at the level of he rear face of the crystal (4) during the return paths; and $\phi_c^r$ is the phase of the complementary radiation measured at the level of rear face of the crystal (4) during the return paths 7. The parametric oscillator as claimed in claim 6, wherein the pair of dispersive dielectric mirrors and the standard dielectric mirror are joined by material of variable optical length, due to which the operating mode is changeable.

8. The parametric oscillator as claimed in claim 6, wherein the non-linear crystal is used in quasi phase tuning and in that the last domain (11) has a variable optical length due to which the operating mode is changeable.

9. The parametric oscillator as claimed in claim 8, wherein the variable optical length comes from the prismatic form of the last domain, due to which the operating mode is changeable by translation of the crystal in a direction orthogonal to the pump radiation.

10. The parametric oscillator as claimed in claim 8, wherein an electrical field is applied along the crystallographic axis of the crystal to vary the optical length.

* * * * *

UNITED STATES PATENT AND TRADEMARK OFFICE
CERTIFICATE OF CORRECTION

| | | |
|---|---|---|
| PATENT NO. | : 8,279,517 B2 | Page 1 of 1 |
| APPLICATION NO. | : 12/308678 | |
| DATED | : October 2, 2012 | |
| INVENTOR(S) | : Michel Lefebvre, Ajmal Mohamed and Antoine Godard | |

It is certified that error appears in the above-identified patent and that said Letters Patent is hereby corrected as shown below:

In the Claims, Column 13, Claim 1, line 7, please insert --is-- before "the phase".

Column 14, Claim 6, line 4, please delete "$(\varphi_s^r$" and insert --$-(\varphi_s^r$--.

Column 14, Claim 6, line 4, please delete "$\Delta\Phi^{ar} = \Delta\Phi^a$" and insert --$\Delta\Phi^{ar} = \Delta\Phi^r - \Delta\Phi^a$--.

Column 14, Claim 6, line 29, please delete "he" and insert --the--.

Signed and Sealed this
Twenty-fifth Day of December, 2012

David J. Kappos
*Director of the United States Patent and Trademark Office*